United States Patent
Stefani et al.

(10) Patent No.: US 10,525,755 B2
(45) Date of Patent: Jan. 7, 2020

(54) METHOD, SYSTEM AND PRINTER FOR DIGITAL PRINTING IN QUANTITY

(71) Applicant: SYSTEM S.P.A., Fiorano Modenese (Modena) (IT)

(72) Inventors: Franco Stefani, Sassuolo (IT); Paolo Casarini, Modena (IT); Simone Giardino, Vasto (IT)

(73) Assignee: SYSTEM S.P.A., Fiorano Modenese (Modena) (IT)

(*) Notice: Subject to any disclaimer, the term of this patent is extended or adjusted under 35 U.S.C. 154(b) by 133 days.

(21) Appl. No.: 15/760,613

(22) PCT Filed: Sep. 22, 2016

(86) PCT No.: PCT/IB2016/055650
§ 371 (c)(1),
(2) Date: Mar. 15, 2018

(87) PCT Pub. No.: WO2017/051337
PCT Pub. Date: Mar. 30, 2017

(65) Prior Publication Data
US 2018/0272776 A1    Sep. 27, 2018

(30) Foreign Application Priority Data

Sep. 23, 2015 (IT) .................. 102015000054235

(51) Int. Cl.
*B41M 5/00* (2006.01)
*B41J 3/407* (2006.01)
(Continued)

(52) U.S. Cl.
CPC ........... *B41M 5/007* (2013.01); *B28B 11/001* (2013.01); *B28B 11/048* (2013.01);
(Continued)

(58) Field of Classification Search
None
See application file for complete search history.

(56) References Cited

U.S. PATENT DOCUMENTS

2004/0036726 A1    2/2004   Zach

FOREIGN PATENT DOCUMENTS

EP     0962323 A1    12/1999
EP     1038689 A1    9/2000
(Continued)

OTHER PUBLICATIONS

Written Opinion of the International Searching Authority for PCT/IB2016/055650 filed in the name of SYSTEM S.P.A. on Sep. 22, 2016, dated Feb. 2, 2017. 6 pgs.
(Continued)

*Primary Examiner* — Alejandro Valencia
(74) *Attorney, Agent, or Firm* — Steinfl + Bruno LLP (57) ABSTRACT

A method for digital printing in quantity, including the steps of providing a conveying unit adapted to convey printing substrates, setting a running velocity, providing a digital printer, providing a graphics file as input to the digital printer representing a motif to be reproduced on the printing substrates at a predefined resolution, calculating a decoration frequency for printing with decorative inks as a function of the predefined resolution and of the running velocity, calculating single material printing frequencies for each one of the material inks, calculating a synchronized printing frequency, calculating a scaling factor, calculating an actual printing frequency as a function of the scaling factors, calculating an actual printing resolution as a function of the actual frequency of material to be deposited and of the running velocity, and printing on the printing substrates at the actual printing resolution.

16 Claims, 7 Drawing Sheets

(51) Int. Cl.
*B28B 11/04* (2006.01)
*G06K 15/02* (2006.01)
*B28B 11/00* (2006.01)
*B41J 2/045* (2006.01)

(52) U.S. Cl.
CPC ....... *B41J 2/04573* (2013.01); *B41J 2/04586* (2013.01); *B41J 3/407* (2013.01); *B41M 5/0047* (2013.01); *G06K 15/1868* (2013.01)

(56) References Cited

FOREIGN PATENT DOCUMENTS

| EP | 2918560 A1 | 9/2015 |
| GB | 2316513 A | 2/1998 |
| WO | 2007/091136 A1 | 8/2007 |
| WO | 2014/109702 A1 | 7/2014 |

OTHER PUBLICATIONS

International Search Report for PCT/IB2016/055650 filed in the name of SYSTEM S.P.A. on Sep. 22, 2016, dated Feb. 2, 2017. 4 pgs.

| | Material mi | | | |
|---|---|---|---|---|
| HORIZONTAL RESOLUTION | DPI (RIS_pred) | 400 | | |
| SPEED | m/min | 20 | | |
| LEVEL | fmi; f'mi<br>FREQUENCY<br>Hz | P1<br>OUTPUT<br>µg/sec | | Qmi; Qmi_eff<br>COVERAGE<br>g/m² |
| 1 | 5000 | 172,1 | | 8,131 |
| 1 | 5500 | 192,6 | | 9,099 |
| 1 | 6000 | 209,9 | | 9,917 |
| 1 | 6500 | 230,6 | | 10,894 |
| 1 | 7000 | 254,2 | | 12,009 |
| 1 | 7500 | 263,8 | | 12,463 |
| 1 | 8000 | 290,2 | | 13,710 |
| 1 | 8500 | 324,4 | | 15,326 |
| 1 | 9000 | 336,9 | | 15,917 |
| 1 | 9648 | 336,9 | | 15,917 |
| 1 | 10000 | 353,5 | | 16,701 |
| 1 | 10500 | 397,2 | | 18,765 |
| 1 | 11000 | 431,1 | | 20,367 |
| 1 | 11500 | 462,9 | | 21,869 |
| 1 | 12000 | 485,7 | | 22,946 |
| 2 | 5000 | 315,5 | | 14,906 |
| 2 | 5500 | 344,8 | | 16,290 |
| 2 | 6000 | 385,8 | | 18,227 |
| 2 | 6500 | 406,7 | | 19,214 |
| 2 | 7000 | 464,4 | | 21,940 |
| 2 | 7500 | 468,8 | | 22,148 |
| 2 | 8000 | 504,2 | | 23,820 |
| 2 | 8500 | 591,3 | | 27,935 |
| 2 | 9000 | 628,4 | | 29,688 |
| 2 | 9000 | 628,4 | | 29,688 |
| 2 | 10163 | 628,4 | | 29,688 |
| 2 | 10500 | 686,5 | | 32,433 |
| 2 | 11000 | 762,5 | | 36,024 |
| 2 | 11500 | 823,4 | | 38,901 |
| 2 | 12000 | 920,5 | | 43,488 |
| 2 | 12500 | 925,5 | | 43,724 |
| 3 | 5000 | 411,5 | | 19,441 |
| 3 | 5500 | 465,9 | | 22,011 |
| 3 | 6000 | 511,3 | | 24,156 |
| 3 | 6500 | 560,5 | | 26,480 |
| 3 | 7000 | 591,1 | | 27,926 |
| 3 | 7500 | 632,2 | | 29,868 |
| 3 | 8000 | 710,4 | | 33,562 |
| 3 | 8500 | 741,5 | | 35,031 |
| 3 | 9000 | 818,8 | | 38,683 |
| 3 | 9798 | 818,8 | | 38,683 |
| 3 | 10000 | 845,7 | | 39,954 |
| 3 | 10500 | 966,9 | | 45,680 |
| 3 | 10500 | 966,9 | | 45,680 |
| 3 | 11695 | 966,9 | | 45,680 |
| 3 | 12000 | 1098 | | 51,874 |

Fig. 4 GENERAL CASE $$\frac{RIS\_eff}{RIS\_pred} = CF = \frac{380}{400} = 0{,}95 = RR\_eff$$

Rr_sup=1
Rr_inf=0

Approximation Rr=Rr_sup=1

Tab_m1 = table with Pr=1024 elements with Rr_sup dots x element

| 1 | 2 | 3 | ... | 100 | 101 | 102 | ... | 500 | 501 | 502 | ... | 1024 |
|---|---|---|-----|-----|-----|-----|-----|-----|-----|-----|-----|------|
| 1 | 1 | 1 | ... | 1   | 1   | 1   | ... | 1   | 1   | 1   | ... | 1    |

R

Pt_tot=Rr_sup x Pr=1 x 1024=1024 printing dots with Rr_sup REPETITIONS

Fig.5 OPTIMAL CASE $$\frac{RIS\_eff}{RIS\_pred} = CF = \frac{380}{400} = 0{,}95 = RR\_eff$$

Rr_sup=1
Rr_inf=0

Tab_m2 = table with Pr=1024 elements with Rr_eff=0,95 dots x element

| 1 | 2 | 3 | ... | 100 | 101 | 102 | ... | 500 | 501 | 502 | ... | 1024 |
|---|---|---|-----|-----|-----|-----|-----|-----|-----|-----|-----|------|
| 1 | 0 | 1 | ... | 1   | 1   | 1   | ... | 0   | 1   | 1   | ... | 1    |

R

Pt_tot_eff=Rr_eff x Pr=0,95 x 1024=973 printing dots with Rr_sup REPETITIONS
Sst=Pt_tot−Pt_tot_eff=1024−973=51 printing dots with Rr_inf REPETITIONS

METHOD, SYSTEM AND PRINTER FOR DIGITAL PRINTING IN QUANTITY

CROSS REFERENCE TO RELATED APPLICATIONS

The present application is the U.S. national stage of International Patent Application PCT/IB2016/055650 filed internationally on Sep. 22, 2016, which, in turn, claims priority to Italian Patent Application No. 102015000054235 filed on Sep. 23, 2015.

FIELD OF APPLICATION

The object of the present invention is a method and system for digital printing in quantity.

In particular, the object of the present invention is a method and system for digital printing in quantity for controlling the quantity of material to be deposited during the printing process.

PRIOR ART

Resolution, that is, the number of dots printed on the plane surface, per linear unit, usually measured in dots per inch (DPI), is currently the principal reference parameter for digital printing. In fact, this is a direct result of how digitization is realized, that is, utilizing an arrangement of basic deposition units for depositing a material (preferentially a liquid), arranged in a line, which, when suitably moved and actuated, realize a rectangular grid of dots of material on the printing substrate.

A digital printing system is provided with an image processor, which, starting from an input graphics file, converts it and produces a new file that can be used by the printer. This step is necessary because the original graphics do not contain information on the printing substrate (that is, on the surface on which one needs to print); converting the information on the printing substrate based on the characteristics of the printing unit is essential for achieving a satisfactory process.

The number of dots present in the flat unit, that is, the resolution, is set in both the input file and in the file used for the printing process. In fact, the files have rectangular grids of values, in which each individual value is essential information, needed by the individual printing actuator in order to operate.

Printing on ceramics is used to realize coloured designs, that is, the motif to be reproduced on the printing substrate, as well as to translate effects of "matter" into actuality through the deposition of layers of materials.

The two applications have different requirements in terms of implementation: for decoration (usually coloured), it is essential to intervene upon the printing resolution, whereas for the realization of the material aspect, it is necessary to intervene upon the quantity of material deposited.

In the solutions of the prior art, realization of the material part requires a file for the printer to be produced with a motif to be printed and with a given resolution. Following completion of the printing process, an operator checks to ensure that the desired amount of material has been printed. If, as is often the case, the operator finds that extra (or less) material has been discharged, with respect to a quantity considered to be optimal, then a new input file is produced with a different resolution, which is higher or lower with respect to that of the previous file, so as to obtain as a result a printing of material closer to the quantity considered to be optimal. The process is thus realized on the basis of a sequence of attempts.

Therefore, this process requires continuous intervention to prepare subsequent printing grids with different resolutions guiding the material printing.

To sum up, the resolution systems of the prior art have considerable drawbacks as they are in themselves complex and they result in a slow production process.

Moreover, they are absolutely lacking in versatility and are intrinsically linked to the skill and experience of the operator.

The aim of the present invention is to realize a method and system for digital printing in quantity that resolve the above-mentioned problems, overcoming the drawbacks of the prior art.

A specific aim of the present invention is to realize a method and system for digital printing in quantity that are versatile and efficient.

A further specific aim of the present invention is to realize a method and system for digital printing that are easy to realize structurally.

A further specific aim of the present invention is to realize a method and system for digital printing with a low level of complexity in terms of command.

SUMMARY OF THE INVENTION

In a first aspect, the present invention discloses a method for digital printing in quantity, comprising the steps of:
providing a conveying unit adapted to convey printing substrates on which to print in quantity;
setting a running velocity for the conveying unit;
providing a digital printer, coupled to a conveying unit and equipped with a plurality of printing modules configured to print on the printing substrates with decorative inks and/or material inks;
providing a graphics file as input to the digital printer, the file representing a motif to be reproduced on at least one of the printing substrates at a predefined resolution;
calculating a decoration frequency for printing with the decorative inks as a function of the predefined resolution and of the set running velocity;
calculating single material printing frequencies for each one of the material inks as a function of predefined theoretical quantities of material to be deposited on the printing substrates;
calculating a synchronized printing frequency substantially obtained as a multiple value of the decoration frequency lower than a predefined synchronized printing value;
calculating a scaling factor obtained as the ratio between the synchronized printing frequency and one of the following: the decoration frequency and each one of the single material printing frequencies;
calculating an actual printing frequency as a function of said scaling factors;
calculating an actual printing resolution as a combined function of the actual material printing frequency and of the running velocity of the conveying unit;
printing on the printing substrates at the actual printing resolution.

Preferably, the method further comprises the steps of:
calculating actual quantities of material to be deposited as a function of the actual frequencies;
comparing the actual quantities of material to be deposited and the theoretical starting quantities.

Preferably, the method further comprises the steps of:
calculating a deviation of the quantity as a function of the comparison between the actual quantities of material to be deposited and the theoretical starting quantities;
If the deviation of the quantity is below a predefined threshold, calculating the actual printing resolution as a combined function of the actual material printing frequency and of the running velocity of the conveying unit; printing on the printing substrates at the actual printing resolution.

The step of printing on the printing substrates at the actual printing resolution preferably comprises the step of modifying the input graphics file being inputted to the digital printer so as to determine an actual graphics file realized with the actual printing resolution.

Preferably, the step of modifying the input graphics file comprises the steps of:
comparing the predefined resolution with the actual printing resolution;
calculating a number of repetitions of a line to be carried out so as to print each line of the original graphics file on the at least one of the printing substrates as a function of the comparison;
commanding a printing of the line in the calculated number of line repetitions.

The number of repetitions of a line is preferably calculated as the integer closest to the comparison value.

The number of repetitions of a line is preferably calculated as one of the following:
a higher integer closest to the comparison value;
a lower integer closest to the comparison value.

A number of actual repetitions of a line is preferably calculated as the value of a real number of the comparison value.

Preferably, the method further comprises the steps of:
creating a mapping table for printing the line on which to determine the distribution of printing dots so as to print the actual graphics file at the actual resolution;
calculating a total number of printing dots to be deposited, corresponding to the product of the higher integer and a depth of the line, so that:
total number of printing dots=number of dots of the higher integer closest to the comparison value x line elements.
calculating an actual value for printing dots to be deposited, corresponding to the actual value for repetitions.

Preferably, the method further comprises the steps of:
calculating a deviation between the value for printing dots to be deposited and the actual value for printing dots to be deposited as a function of the depth of the line;
printing the actual dots, uniformly distributing the deviation elements over the depth of the line.

In a preferred embodiment, the method is implemented by means of a computer.

In a second aspect, the invention discloses a system for digital printing in quantity comprising:
a conveying unit adapted to convey printing substrates on which to print in quantity and adapted to run at a running velocity;
a digital printer, coupled to the conveying unit and equipped with a plurality of printing modules configured to print on the printing substrates with decorative inks and/or material inks;
a processing unit configured to command the digital printer to print, starting from a graphics file representing a motif to be reproduced on at least one of the printing substrates, wherein the processing unit comprises:

a first calculation module configured to calculate a decoration frequency, for printing with the decorative inks, as a function of a predefined resolution of the graphics file and of the running velocity;
a second calculation module configured to calculate single material printing frequencies for each one of the material inks as a function of predefined theoretical quantities of material;
a third calculation module configured to calculate a synchronized printing frequency substantially as a multiple value of the decoration frequency, the synchronized printing frequency being lower than a predefined synchronized printing value;
a scaling module configured to calculate scaling factors as the ratio between the synchronized printing frequency and one of the following: the decoration frequency and each one of the single material printing frequencies;
a fourth calculation module configured to calculate an actual material printing frequency as a function of the scaling factors;
a fifth calculation module configured to calculate an actual printing resolution as a combined function of the actual material printing frequency and of said running velocity of the conveying unit;
a printing module configured to command printing by the digital printer on at least one of the printing substrates at the actual printing resolution.

Preferably, the processing unit further comprises:
a sixth calculation module, comprising:
a first sub-module configured to calculate an actual quantity of material to be deposited as a function of the actual frequency calculated by the fifth calculation module;
a second sub-module configured to compare the actual quantities of material to be deposited and the starting theoretical quantities, calculating a deviation of the quantity;
wherein the calculation module is configured to display the actual quantities of material to be deposited and the compared starting theoretical quantities.

Preferably, the sixth calculation module further comprises a third sub-module configured to:
compare the deviation of the quantity with a predefined threshold;
send the actual frequency to the fifth calculation module, if the deviation of the quantity is below a predefined threshold.

The printing module preferably comprises a first processing sub-module configured to
compare the predefined resolution with the actual printing resolution;
calculate a number of repetitions of a line to be carried out so as to print each line of the original graphics file on the at least one of the printing substrates, as a function of the comparison;
command a printing of the line in the calculated number of line repetitions.

The printing module preferably comprises a second processing sub-module configured to calculate the number of repetitions of a line as the integer closest to the comparison value.

The second processing sub-module is configured to calculate the number of repetitions of a line as one of the following:
a higher integer closest to the comparison value;
a lower integer closest to the comparison value.

The second processing sub-module is preferably configured to calculate the number of repetitions as the number of actual repetitions of a line calculated as the value of a real number of the comparison value.

The printing module preferably comprises a mapping sub-module configured to:
create a mapping table for printing the line on which to determine the distribution of printing dots so as to print the actual graphics file at the actual resolution;
calculate a total number of printing dots to be deposited, corresponding to the product of the higher integer and a depth of the line, so that:
total number of printing dots=number of printing dots of the higher integer closest to the comparison value x line elements.
calculate an actual value for printing dots to be deposited, corresponding to the actual value for repetitions.

The printing module preferably comprises a calculation sub-module configured to:
calculate a deviation between the value for printing dots to be deposited and the actual value for printing dots to be deposited as a function of the depth of the line;
command a printing of the actual dots, uniformly distributing the deviation elements over the depth of the line.

Preferably, the digital printing system comprises an interface unit coupled to the digital printer and/or to the conveying unit and configured to receive input data for the printer and/or for the conveying unit, wherein said interface unit comprises one or more of the following:
a first interface module configured to receive as input a graphics file representing a motif to be reproduced on at least one of the printing substrates at a predefined resolution;
a second interface module configured to receive as input the running velocity;
a third interface module configured to receive as input predefined theoretical quantities of material to be deposited on the printing substrates for each one of the material inks;
a fourth interface module configured to receive as input a predefined synchronized printing value;
and the processing unit is in data connection with the interface unit and configured to command the digital printer as a function of the data received from the interface unit.

In a third aspect, the invention discloses a digital printer comprising:
a plurality of printing modules configured to print on the printing substrates with decorative inks and/or material inks;
a processing unit configured to command the digital printer to print, starting from a graphics file representing a motif to be reproduced on at least one of the printing substrates, wherein the processing unit comprises:
a first calculation module configured to calculate a decoration frequency, for printing with the decorative inks, as a function of a predefined resolution of the graphics file and of a predefined running velocity of the printing substrates;
a second calculation module configured to calculate single material printing frequencies for each one of the material inks as a function of predefined theoretical quantities of material;
a third calculation module configured to calculate a synchronized printing frequency substantially as a multiple value of the decoration frequency lower than a predefined synchronized printing frequency value;
a scaling module configured to calculate scaling factors as a ratio between the synchronized printing frequency and one of the following: the decoration frequency (fd) and each one of the single material printing frequencies;
a fourth calculation module configured to calculate an actual material printing frequency as a function of the scaling factors;
a fifth calculation module configured to calculate an actual printing resolution as a function of the actual material printing frequency;
a printing module configured to command printing on at least one of the printing substrates at the calculated actual printing resolution.

Preferably, the processing unit comprises:
a sixth calculation module as previously described for the printing system and/or an interface unit as described for the printing system and/or
the printing module configured to define a printing grid for printing on at least one of the printing substrates at the calculated actual printing resolution.

Preferably, the printing substrates comprise ceramic bases.

Preferably, each printing module (Mod_i) is configured for discharging a particular printing ink.

Preferably, each printing module (Mod_i) comprises individual impression units.

Preferably, the decorative inks comprise coloured inks.

Preferably, the "material" inks comprise one or more of the following: lustre, opaque, touch-sensitizing material inks, creators of relief or recessed, concave or convex structures to increase the compliance of the printing substrate with the actual design reproduced.

In a fourth aspect, the invention discloses a computer program, which, when running in the system and/or in the printer described, executes one or more of the steps of the method disclosed.

The invention, as disclosed, supplies the user with a tool for controlling the "materials" to be deposited by means of printing, realizing control over of the quantities of material to be deposited, unlike the conventional resolution printing systems in which the number of dots to be printed is controlled.

The principal technical effect achieved consists in the realization of the printing process with reduced printing time and enhanced printing quality.

Moreover, the invention, as disclosed, achieves additional technical effects with respect to the conventional resolution printing systems/methods:
 unaltered structure of the printing system; additional hardware is not required, in that the hardware present is optimized;
 easy use even by an unskilled operator.

The technical effects/advantages cited and other technical effects/advantages of the invention will emerge in further detail from the description provided herein below of an example embodiment and they are provided by way of approximate and non-limiting example with reference to the attached drawings.

DETAILED DESCRIPTION

The object of the present invention is a method and a system for digital printing in quantity, for controlling the quantity of material to be deposited during the printing process on printing substrates, whether the latter are rigid or flexible.

In a preferred embodiment of the invention, described below, the printing substrates comprise ceramic substrates, particularly ceramic tiles.

Printing on ceramics is used to realize the coloured design, with decorative inks, as well as to translate effects of "matter" into actuality, with material inks.

For example, the decorative inks are coloured inks in colours such as cyan, magenta, yellow and black and they are discharged as a function of a pre-set resolution starting from an input graphics file.

The shading, quality of the detail, fineness of the lines and the right colour are essential for the decoration (usually coloured). All of this is obtained and improved by acting upon the printing resolution, upon the dimensions of the dots that can be realized on a single zone and upon the control for alignment of the various printing planes. In short, small quantities of individual colours are used (for example, subtractive synthesis is utilized—4 basic colours—and the controlled deposition thereof makes it possible to obtain a more or less vast set of tones) deposited on a grid made up of a high number of dots.

Printing resolution, as measured for example in DPI, is understood as the longitudinal printing resolution RL coinciding with the direction of travel of a conveyor belt adapted to transport the printing supports.

Transversal printing resolution RT, instead, is perpendicular to the direction of travel of the above-mentioned conveyor belt and it is fixed by the mechanics of the printer.

The "material" inks in the invention that shall be disclosed herein below must be discharged as a function of the required quantity of material to be printed, for example for relief, ribbing and groove effects, etc.

"Material" inks serve to translate effects of "matter" into actuality through the deposition of materials—lustre, opaque, touch-sensitizing materials, creators of relief or recessed, concave or convex structures—which increase the compliance of the tile with the reality copied (marble, stone, fabric and wood).

In other words, the "material" inks comprise one or more of the following: lustre, opaque, touch-sensitizing material inks, creators of relief or recessed, concave or convex structures to increase the compliance of the printing substrate with the actual design reproduced.

The invention, as disclosed, supplies the user with a tool for controlling the materials to be deposited by means of printing, realizing control over of the quantities to be deposited (grams), rather than controlling the number of dots to be printed (DPI) as is the case with conventional resolution printing systems.

The invention makes it possible for inks for realizing the decorations and material inks to coexist in the same environment, determining individual deposition frequencies for all the printing inks.

Figure 1:
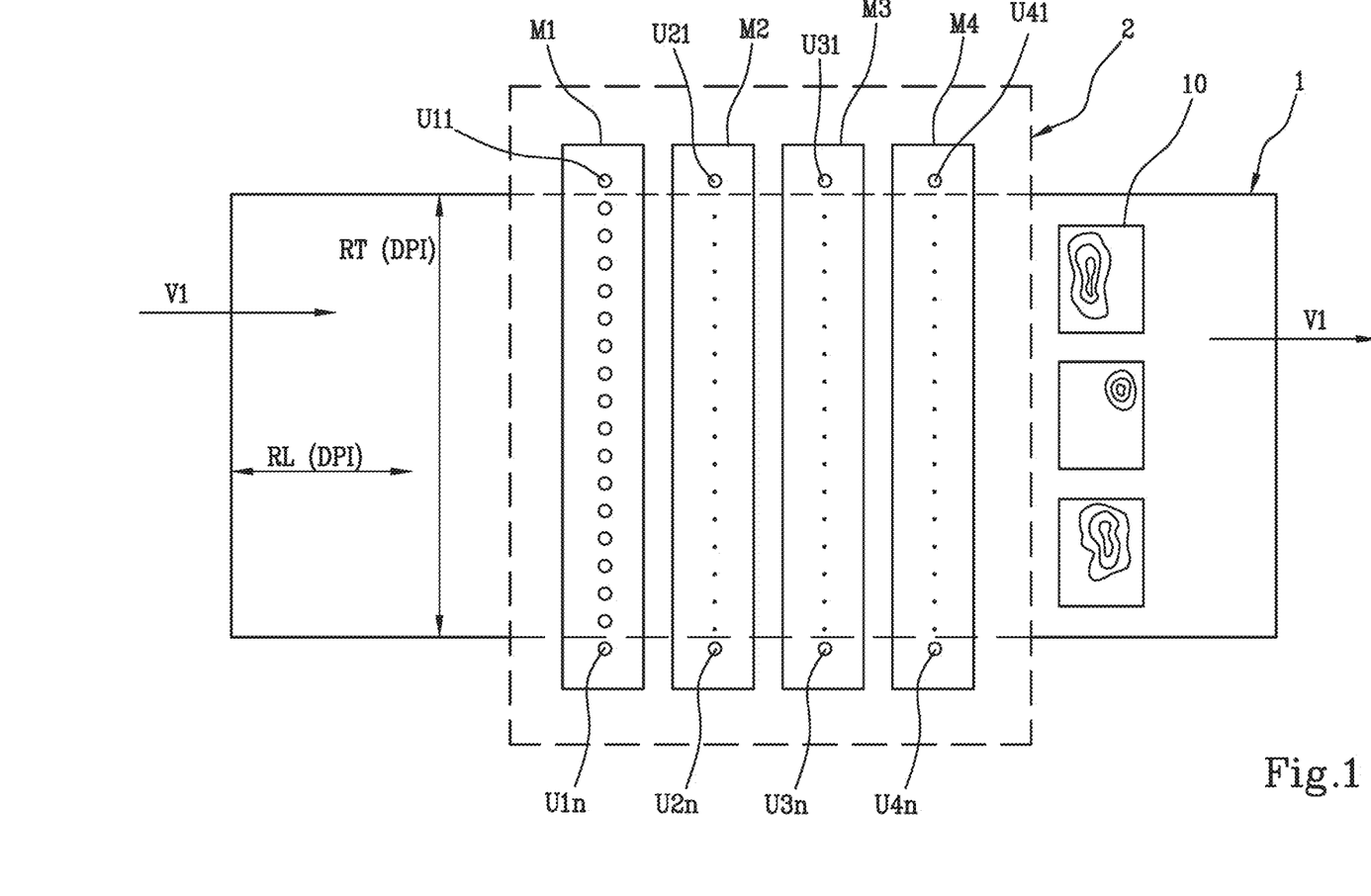
FIG. 1 is an overall view of the printing system of the invention.
Figure 2:
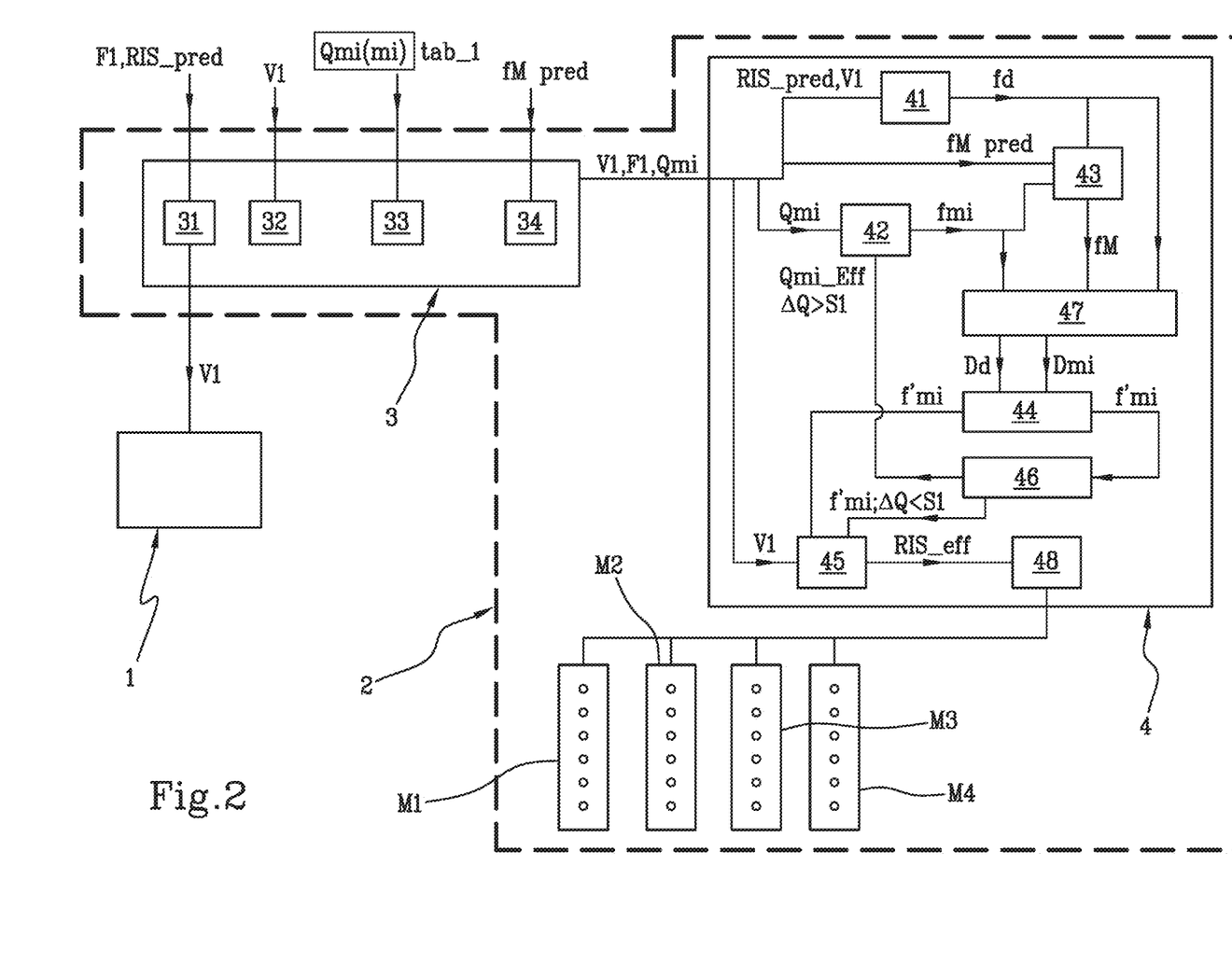
FIG. 2 is a functional block diagram of the system of FIG. 1.

According to the invention, with particular reference to FIGS. 1 and 2, a system for digital printing in quantity according to the invention comprises a conveying unit 1, particularly a conveyor belt, adapted to convey printing substrates 10 on which to print in quantity and adapted to run at a running speed V1.

In a preferred embodiment of the invention, the printing substrates 10 comprise ceramic bases.

The system further comprises a digital printer 2, coupled to the conveying unit and equipped with a plurality of printing modules Mod_i configured to print on the printing substrates 10 with decorative inks Idi and/or material inks Imi.

Preferably, each printing module Mod_i is configured for discharging a particular printing ink Idi; i=1 . . . n; Imi: i=1 . . . n, as shown in FIG. 1.

Preferably, each printing module Mod_i comprises individual impression units Uij: i=1 . . . n; j=1 . . . m, where "i" indicates the module Mi on which the impression unit is mounted and "j" indicates the cardinal number of the impression units in the module Mi.

In some specific embodiments, some printing modules can be dedicated to printing with decorative inks or to printing with material inks.

The system further comprises a processing unit 4, shown in FIG. 2, configured to command the digital printer 2 to print, starting from a graphics file F1 representing a motif to be reproduced on at least one of the printing substrates 10.

The invention comprises providing a graphics file F1 as input to the digital printer 2, the file representing a motif to be reproduced on at least one of the printing substrates 10 at a predefined resolution RIS_pred.

For this purpose and with reference to FIG. 2, the system of the invention comprises an interface unit 3 coupled to the digital printer 2 and/or to the conveying unit 1 and configured to receive input data for the printer 2 and/or for the conveying unit 1.

Preferably, the processing unit 4 is in data connection with the interface unit 3 and configured to command the digital printer 2 as a function of the data received from the interface unit 3.

In particular, the interface unit 3 comprises a first interface module 31 configured to receive as input the graphics file F1 representing a motif to be reproduced on at least one of the printing substrates 10 at a predefined resolution RIS_pred.

Furthermore, the interface unit 3 comprises a second interface module 32 configured to receive as input the running velocity V1 of the conveying unit 1.

Once the predefined resolution and the running velocity have been received, the invention comprises the calculation of a decoration frequency fd for printing with the decorative inks Idi as a function of the predefined resolution RIS_pred and of the running velocity V1.

In other words, once the resolution RIS_pred has been set by the graphics file F1, the running speed V1 will determine a shooting frequency for printing at the given resolution; if the velocity V1 increases, then it will be necessary to "shoot" faster.

Advantageously, changing the velocity and keeping the resolution fixed obviously changes the shooting frequency. As the response in frequency of the heads is not linear, a different quantity of material deposited (and thus the number of drops shot per surface unit) is obtained by varying the velocity, even with a fixed resolution.

The processing unit 4 comprises a first calculation module 41 configured to calculate the above-mentioned decoration frequency fd.

In an example embodiment, starting from:
a predefined resolution RIS_pred=400 DPI
a running speed V1=20 m/min=0.5 m/sec the decoration frequency fd is calculated as follows:

$$fd = V1 \times RIS\_pred = 5200 \text{ drops/sec or Hz (approximately)}.$$

The invention further comprises calculation of single material printing frequencies fmi for each material ink Imi as a function of predefined theoretical quantities Qmi of material mi to be deposited on the printing substrates 10.

In particular, the theoretical quantities Qmi are defined as a function of each printing substrate 10 that can be realized.

Figure 3:
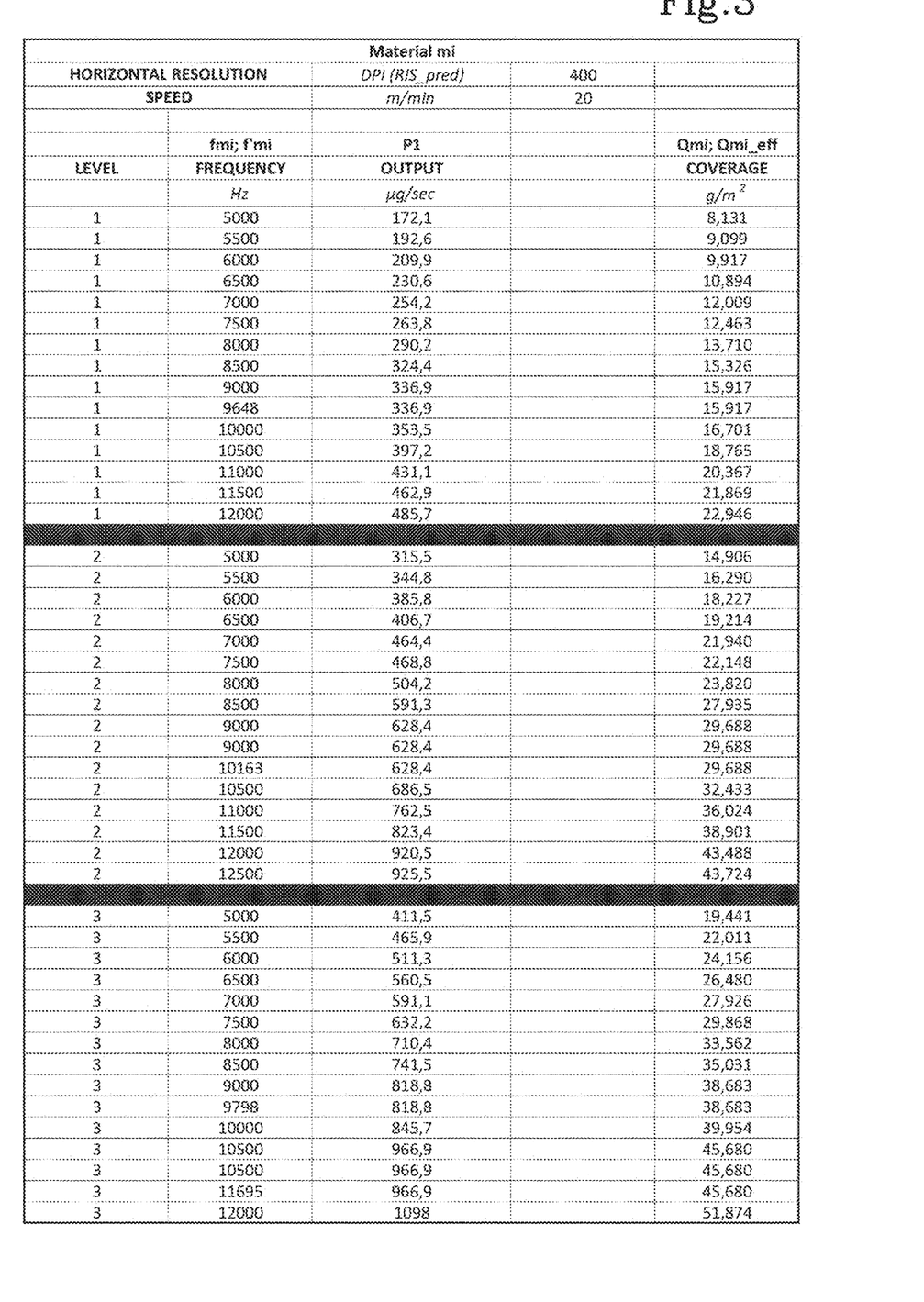
FIG. 3 is a reference table for operation of the system of the preceding figures.

The theoretical quantities Qmi are further defined as a function of the output of the printer 2, as reported in the reference table Tab_1 in FIG. 3.

The reference table Tab_1 comprises data representing the production cycle of the digital printer 2 as a function of Level-Frequency-Output for each printable material mi.

The table Tab_1, comprises the following values for each material:
the material printing frequency fmi or f'mi;
the output of the head Pi;
the level, that is, the size of the printing drop.

The term "material printing frequency" herein below in the description is understood as a frequency calculated on the basis of the quantity of material to be deposited.

The representative data are calculated at a given resolution RIS_pred and at a given running velocity V1 of the belt.

The values of the printable theoretical quantities Qmi are defined a priori as a function of the values in the table.

With reference to FIG. 3, it is generally possible to assume that there are three possible types of drops of printing ink, including decorative or material ink: small, medium and large, indicated in the figure as Levels 1, 2 and 3, respectively.

These levels determine three distinct output tables for each product.

The user decides which drop size to use.

Alternatively, the system independently decides to use the drop having greater frequency so as to provide for a better distribution of the material on the printing support.

When, as in this case, the quantity of material to be discharged Qmi is an input value in Tab_1, the invention makes it possible to obtain the output Pi needed to obtain the preselected discharge and thus the optimal material printing frequency fmi.

The processing unit 4 comprises a third interface module 33 configured to interface the processing unit 4 with the configuration table Tab_1.

In particular, the third interface module 33 is configured to receive as input the predefined theoretical quantities Qmi of material mi to be deposited on the printing substrates 10 for each one of the material inks Imi.

For calculation of the single material printing frequencies fmi, with particular reference to FIG. 2, the processing unit 4 comprises a second calculation module 42 configured to calculate the single material printing frequencies fmi for each one of the material inks Imi as a function of the predefined theoretical quantities Qmi of material mi.

The single material printing frequencies fmi are also calculated as a function of level of the drop of ink to be discharged, that is, as a function of the size of the printing drop.

With reference to the values in the table Tab_1, a material printing frequency value fm1 (i=1) is calculated in correspondence with the respective output value P1.

Starting from a predefined theoretical quantity of material Qm1 (in g/m²), from the predefined resolution Ris_pred (in DPI) and from the running velocity value V1 (in m/min), the output value P1 (in μg/sec) in the table is obtained, in an example case, as:

$$P1 = (Qm1 \times V1/RIS\_pred) \times (25.4/(60 \times 10^{-6} \times 10^{3}));$$

Starting from a theoretical quantity of material Qm1=8.131 g/m2, specific for a product, with the material ink m1, the following is obtained:

$$P1 = (8.131 \times 20/400) \times 423 = 172.1 \text{ μg/sec}$$

The corresponding material printing frequency fm1 is obtained from the table Tab_1 as a function of the output value P1: fm1=5000 Hz.

The invention comprises synchronization of the printing frequencies so as to determine optimal printing quality.

For this purpose, the invention comprises calculating a synchronized printing frequency fM substantially obtained as a multiple value of the decoration frequency fd lower than a predefined synchronization printing frequency value fM_pred.

The technical effect achieved consists in the guarantee of optimal printing quality owing to the deposition of each ink at a frequency approaching the optimal frequency.

Preferably, the synchronized printing frequency fM_pred is fM_pred=500 khz.

Alternatively, the synchronized printing frequency is fM_pred=1000 khz.

A third calculation module 43 of the processing unit 4 is configured to calculate the above-mentioned synchronized printing frequency fM substantially as a multiple value of the decoration frequency fd that is also lower than the predefined synchronized printing value fM_pred.

In the case specified above, with a decoration frequency of fd=5200 drops/sec or Hz, the synchronized printing frequency value fM is given by 500 kz/5200 Hz=96×5.2 khz=499.2 Khz.

With reference to FIG. 2, the interface unit 3 comprises a fourth interface module 34 configured to receive as input the predefined synchronized printing value fM_pred.

The invention comprises calculation of a scaling factor Dd, Dmi: i=1 . . . n obtained as the ratio between the synchronized printing frequency fM and one of the following: the decoration frequency fd and each one of the single material printing frequencies fmi.

The processing unit 4 comprises a scaling module 47 configured to calculate the above-mentioned scaling factors.

In one example embodiment, the scaling module 47 assumes the following as input values:

$$fd = 5200 \text{ hz}; fm1 = 5000 \text{ hz}; fM = fM = 499200 \text{ hz};$$

The scaling module 47 calculates:

$$Dd = fM/fd = 499200 \text{ hz}/5200 \text{ hz} = 96$$

$$Dm1 = fM/fm1 = 499200 \text{ hz}/5000 \text{ hz} = 99.8 \approx = 100.$$

The technical effect achieved consists in the guarantee of precise synchronization of the jet of inks, including both decorative and material inks.

The invention comprises the calculation of actual printing frequencies f'mi as a function of the scaling factors Dd, Dmi: i=1 . . . n, once the scaling factors have been calculated.

The processing unit 4 comprises a fourth calculation module 44 configured to calculate these frequencies.

In an example embodiment, the fourth calculation module 44 assumes as input values Dm1=100 and calculates f'm1=fM/DM=499200/100=4992 hz.

It is understood that the actual frequency value f'm1=4992 hz is different from, though close to, the theoretical frequency value fm1=5000 hz.

This calculated actual frequency value enables precise synchronization of the jet of material ink m1 with the jet of other inks, including decorative or material inks.

In one particular embodiment, the invention comprises calculation of actual quantities Qmi_EFF of material to be deposited as a function of the actual printing frequencies f'mi.

In other words, during the printing process, the system is capable of modifying the quantity of incoming material if a deviation with respect to a threshold value is detected. This embodiment shall be discussed later.

In a first preferred embodiment, the invention comprises calculation of an actual printing resolution RIS_eff as a combined function of the actual material printing frequency f'mi and of the running velocity V1 of the conveying unit 1.

In particular, the actual resolution RIS_eff will be different from the predefined resolution.

The technical effect achieved consists in a run time change in the predefined initial resolution value, which makes it possible to obtain an optimal printing resolution value given that it is calculated based on an optimal printing frequency for each ink.

Moreover, trial printing at various resolutions based on empirical information is not necessary, as one printing with the value obtained in an optimized manner is sufficient.

Very briefly, the most evident technical effect consists in the drastic reduction of the number of production cycles and of the total machine time required for printing given printing supports.

The processing unit 4 comprises a fifth calculation module 45 configured to calculate the above-mentioned actual printing resolution RIS_eff.

In an example embodiment, the actual printing resolution RIS_eff is given by the product of the running velocity V1 of the belt 1 and the actual material printing frequency f'mi. In other words, with reference to the actual frequency f'm1 as calculated above, $$Ris\_eff = f'm1/V1 = 4992 \text{ hz}/(20 \text{ m/min}) = 380 \text{ DPI}.$$

It is understood that the actual resolution value RIS_eff generally differs from the predefined resolution value RIS, as it is obtained by optimization of the initial resolution value.

Modification of the resolution value to be used for printing takes place during the production cycle (that is, at run time) and it does not require repetition of the production cycle to evaluate the printing effect at the new resolution. In fact, the outcome of the printing process will surely be optimized with respect to the outcome that can be realized at the initial resolution, in light of the inventive optimization procedure followed.

The invention then comprises printing on the printing substrates 10 at the actual printing resolution RIS_eff.

The processing unit 4 comprises a printing module 48 configured to command printing by means of the digital printer 2 on at least one of the printing substrates 10 at the actual printing resolution RIS_eff.

The digital printer 2 prints using its plurality of printing modules Mod_i that are equipped with impression units Uij: i=1 ... n; j=1 ... m.

To print on the printing substrates 10 at the actual printing resolution RIS_eff, the invention comprises modification of the input file F1 so that it has the new calculated resolution RIS_eff.

In other words, the invention comprises modification of said input graphics file F1 being inputted to said digital printer 2 so as to determine an actual graphics file F1_eff realized with the actual printing resolution RIS_eff.

Advantageously, this modification is also made during the production cycle (that is, at run time) and it does not require repetition of the entire production cycle.

The most evident technical effect, emphasized a number of times also in the case of the preceding steps of the invention, consists in the drastic reduction of the number of production cycles and of the total machine time required for printing given printing supports.

To modify the input file F1 so that it has the new calculated resolution RIS_eff, the invention comprises comparison CF of the predefined resolution RIS_pred with the actual printing resolution RIS_eff.

As a function of the comparison CF, the invention comprises calculation of a number of line repetitions Rr to be carried out so as to print each line of the original file F1 on the printing substrates 10 and commanding a printing of the line R in the established number of line repetitions Rr.

Figure 2A:
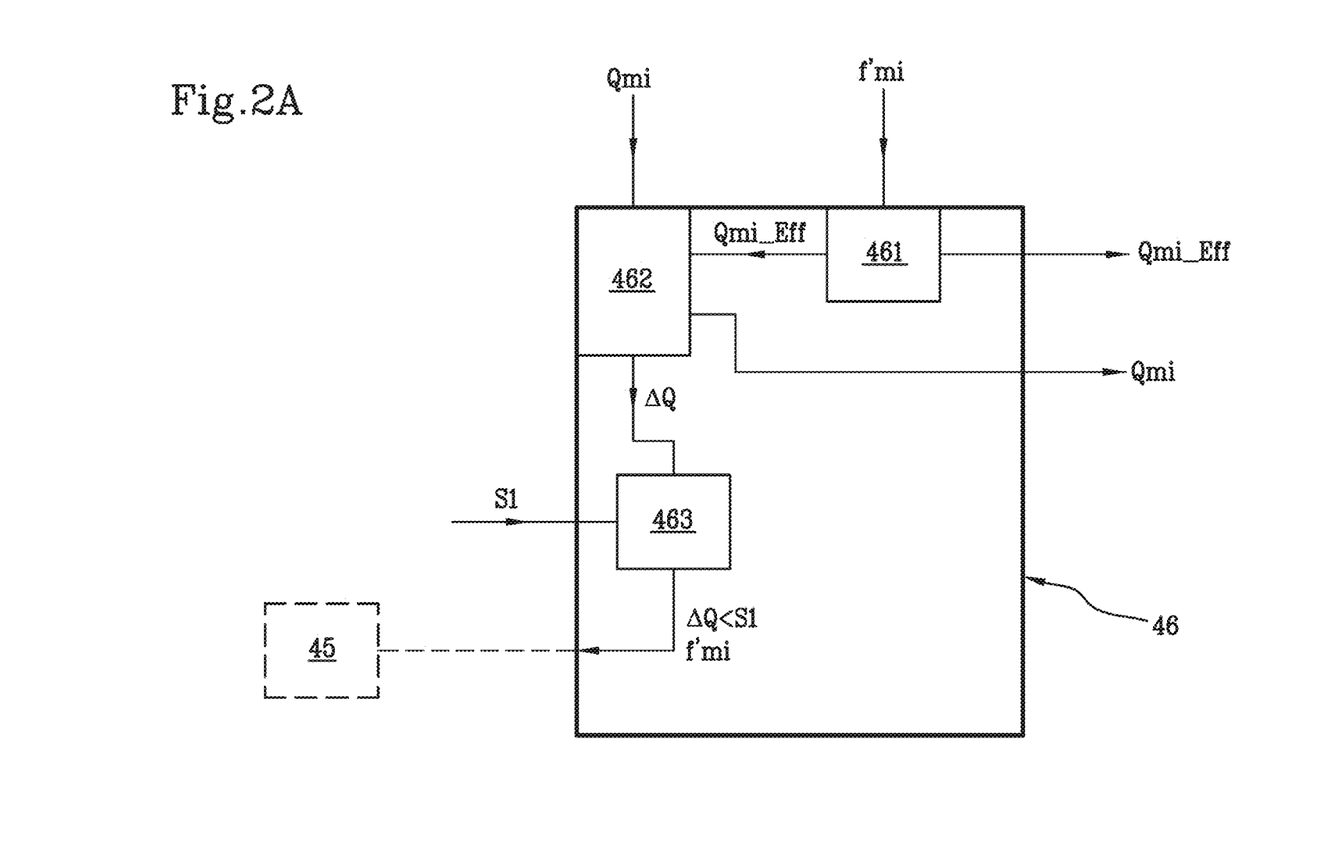
FIG. 2A is a detail of a block comprised in FIG. 2.
Figure 2B:
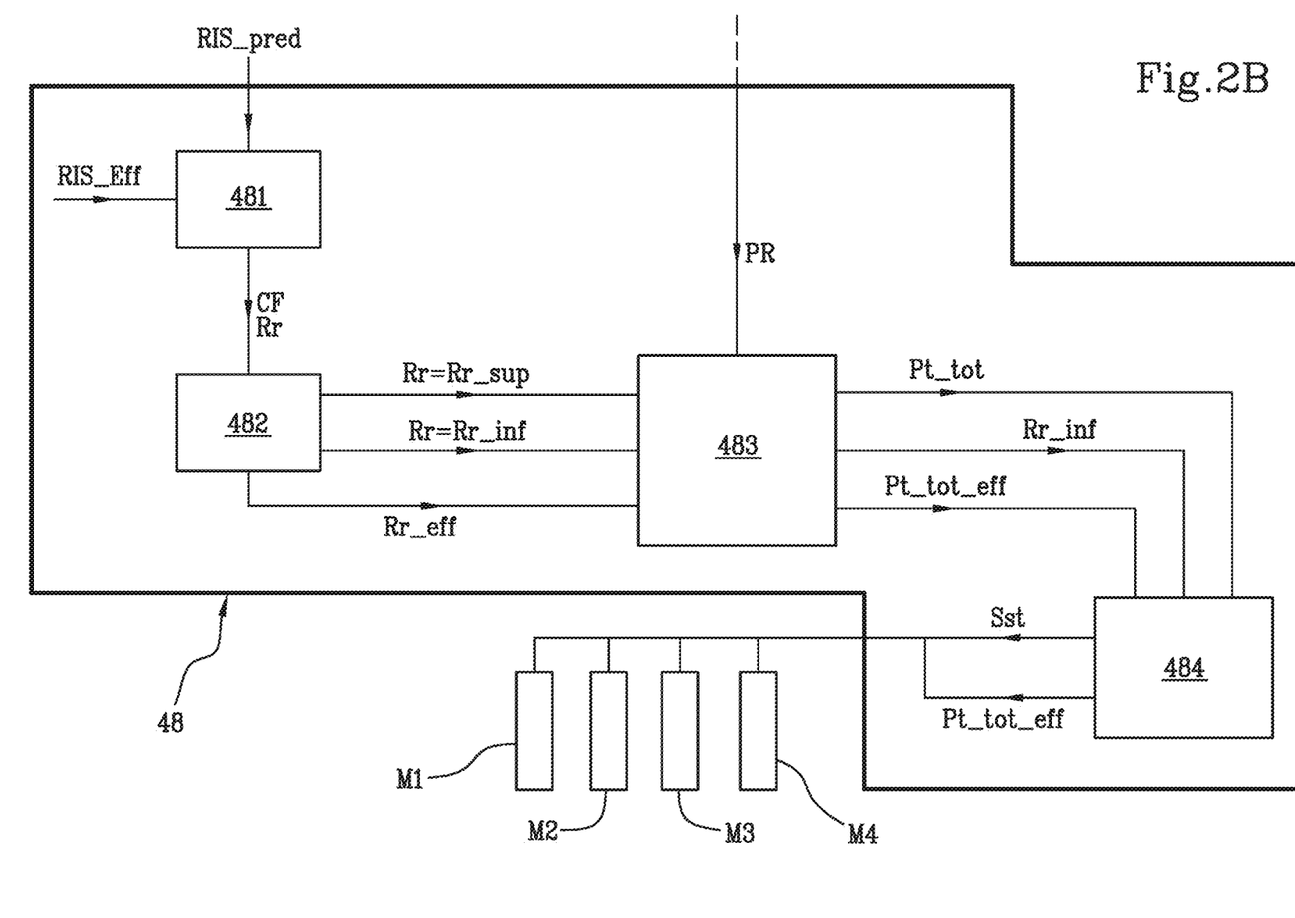
FIG. 2B is a detail of a block comprised in FIG. 2.

A first processing sub-module 481 of the printing module 48, as shown in FIG. 2B, is configured to carry out these procedures.

The actual number of line repetitions to determine an actual graphics file F1_eff realized with the actual printing resolution RIS_eff is Rr=Rr_eff obtained as the value of a real number of the comparison value CF.

According to the invention, the number of repetitions Rr of each line R is calculated as the integer closest to the comparison value CF.

Preferably, in an example embodiment, the number of repetitions Rr coincides with the higher integer Rr_sup closest to the comparison value CF; in other words, Rr=Rr_sup.

Alternatively, the number of repetitions Rr coincides with the lower integer closest to the comparison value CF; in other words, Rr=Rr_inf.

The number of line repetitions is calculated by a second processing sub-module 482 of the printing module 48, as shown in FIG. 2B.

Once the comparison CF has been made, the invention comprises the creation of a mapping table for mapping the print line on which to determine the distribution of printing dots so as to print the actual graphics file F1_eff at the actual resolution Ris_eff.

A mapping sub-module 483 of the printing module 48, as shown in FIG. 2B, carries out the mapping and calculations of the actual number of dots to be printed.

In an example embodiment, if the predefined resolution RIS_pred of the input file F1 is 400 DPI and the calculated actual printing resolution RIS_eff is 380 DPI, the method comprises the comparison CF between the predefined resolution RIS_pred and the actual printing resolution RIS_eff, as the ratio between the actual printing resolution RIS_eff and the predefined resolution RIS_pred. In other words:

$$CF = RIS\_eff/RIS\_pred = 380/400 = 0.95.$$

The real value, 0.95 also represents the actual number of line repetitions Rr_eff to determine the actual graphics file F1_eff to be printed.

Generally, according to the invention, in a first analysis, the number of line repetitions can be considered to be Rr=Rr_sup.

Figure 4:
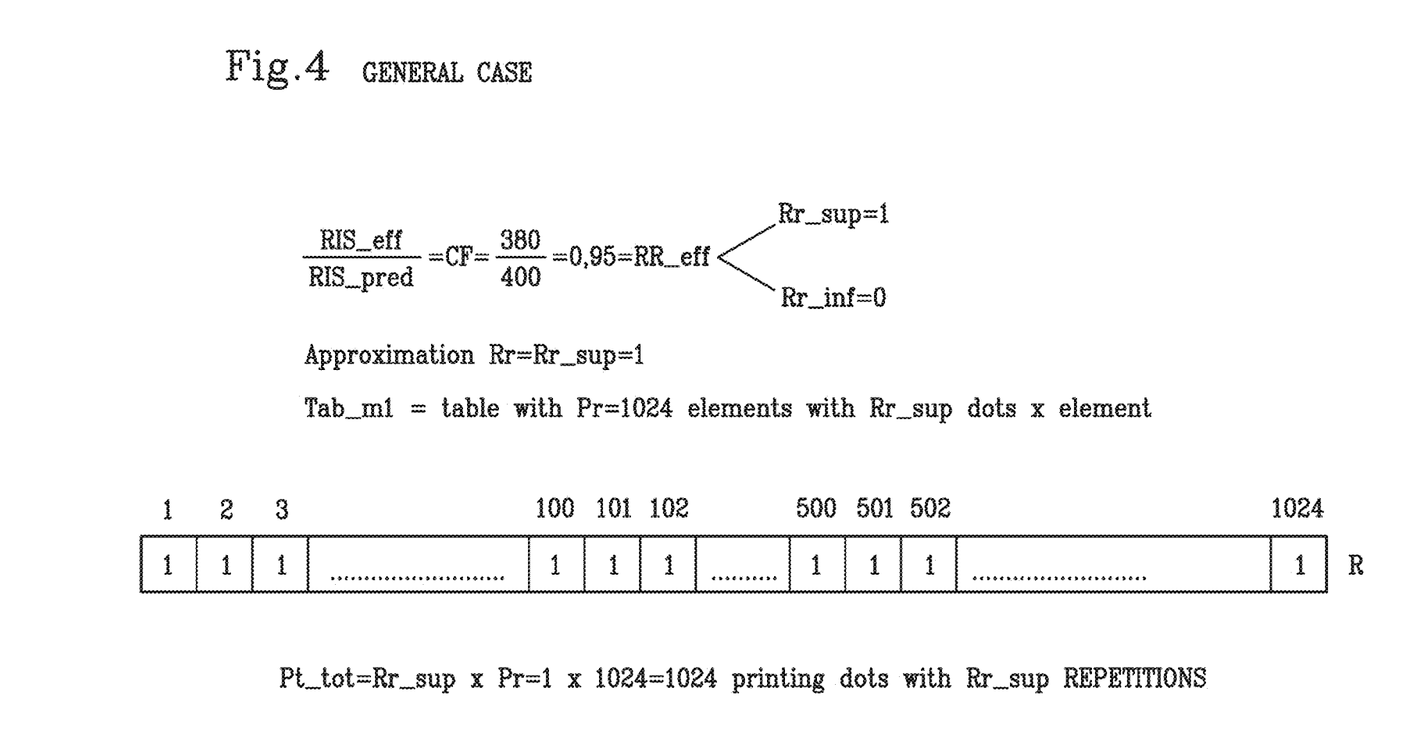
FIG. 4 illustrates a step for processing data for defining the printing dots in one embodiment of the invention.

Referring to FIG. 4 and considering a table tab_m1 for mapping print lines R with 1024 line elements (=line depth PR=# line bits), a total number of dots Pt_tot=Rr_sup dots×line elements will be deposited on each line R.

According to the invention, the line depth PR is defined during the production cycle (that is, at run time) for the purpose of calculating a value that yields the lowest possible approximation error.

In a preferred embodiment, the depth 1024 that is the most efficient in terms of computations is utilized.

Numerically, in the case of the example, Rr_sup=higher integer (0.95)=1.

With a depth PR=1024 bits, in a first analysis, each bit will receive Rr_sup=1 dot, that is, a total of 1024 dots (Pt_tot).

To sum up, Pt_tot=Rr_sup×PR=1×1024=1024 dots.

The technical effect of printing carried out using the procedure illustrated consists in an almost optimal material printing in quantity for the motif to be reproduced with respect to the motif reproduced in the original file, which determines a graphic effect that is almost optimal.

Figure 5:
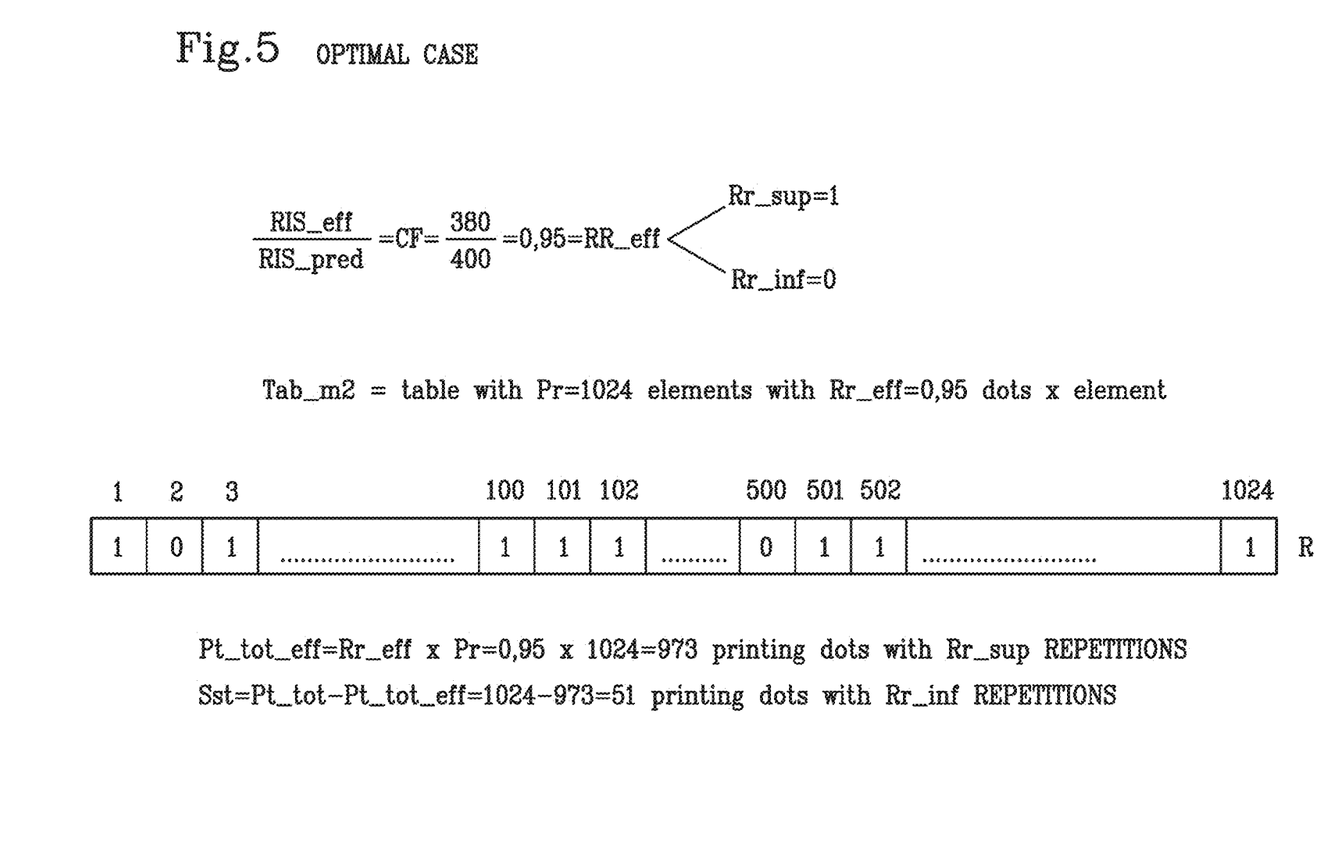
FIG. 5 illustrates a step for processing data for defining the printing dots in another embodiment of the invention.

In an optimal case, as shown in FIG. 5, as the comparison CF usually determines an actual value for line repetitions Rr_eff, which is not a whole number, the method of the invention comprises calculation of an actual value for the printing dots that are to be deposited Pt_tot_eff corresponding to the actual value for repetitions Rr_eff.

The method further comprises calculation of a deviation Sst between the value for the printing dots Pt_tot to be deposited, corresponding to the value for repetitions Rr, and the actual value for the printing dots to be deposited Pt_tot_eff, corresponding to the actual value for repetitions Rr_eff, as a function of line depth PR.

The deviation Sst is calculated by a calculation sub-module 484 of the printing module 48, as shown in FIG. 2B.

In the case of the example, the number of actual dots Pt_tot_eff, at the depth PR=1024 is given by Pt_tot_eff=Rr_eff×P.

To sum up, in the example case, Pt_tot_eff=0.95× 1024≈973.

The deviation of the printing dots Sst is thus calculated as:

$$Sst=Pt\_tot-Pt\_eff.$$

In the example case, Sst=1024−973=51 dots.

The method then comprises mapping a printing grid tabm_2 with 973 elements defined by Rr=1 dot and 51 elements defined by Rr_inf=0 dots.

In general, printing is realized using Pt_tot_eff printing dots with Rr_sup repetitions, and Sst printing dots with Rr_inf repetitions, distributed over a line depth PR.

Advantageously, the invention comprises printing the actual dots Pt_tot_eff, uniformly distributing the deviation elements Sst over the depth PR of the line R.

In other words, the invention comprises printing the actual dots Pt_tot_eff, uniformly distributing the deviation elements Sst among the bits that determine the depth PR of the line R.

It is understood that the deviation value Sst can be obtained starting from Pt_tot_=Rr_inf_×P, calculating Sst=Pt_eff−Pt_tot.

The technical effect of printing carried out using the procedure illustrated consists in an optimal material printing in quantity for the motif to be reproduced, which determines a graphic effect that is optimal.

In a second preferred embodiment, after having calculated the actual material printing frequencies f'mi, the invention comprises calculating actual quantities Qmi_EFF of material to be deposited, as a function of these actual frequencies f'mi, and comparing the actual quantities Qmi_EFF with the theoretical starting quantities Qmi.

In other words, starting from the calculated actual material printing frequency f'mi, the invention calculates, for example by linear interpolation, the exact quantity of material Qmi_EFF to be deposited and checks the degree of its deviation from the theoretical starting value Qmi.

Preferably, it is envisaged that the values for the actual quantities Qmi_EFF of material to be deposited and the theoretical starting quantities Qmi be displayed so as to enable direct control even for an operator.

The actual quantities Qmi_EFF of material are calculated by a sixth calculation module 46 of the processing unit 4, as shown particularly with reference to FIG. 2A.

In this module, a first sub-module 461 is configured to calculate the actual quantity Qmi_EFF of material to be deposited as a function of the actual frequency f'mi calculated by the fifth calculation module 45.

In this module, a second sub-module 462 is configured to compare the actual quantity Qmi_EFF of material to be deposited and the theoretical starting quantities Qmi, calculating the deviation of the quantity ΔQ.

The sixth calculation module 46 is further configured to display the actual quantities Qmi_EFF of material to be deposited and the compared starting theoretical quantities Qmi.

In the sixth calculation module 46, a third sub-module 463 is configured to compare the deviation of the quantity ΔQ with a predefined threshold S1.

If the deviation of the quantity ΔQ is higher than the predefined threshold S1, the sub-module sends the actual quantities Qmi_Eff to the second calculation module 42 so as to recalculate the single material printing frequencies fmi for each material ink Imi.

If the deviation of the quantity ΔQ is below a predefined threshold S1, the sub-module sends the actual frequency f'mi to the fifth calculation module 45.

In the case of the example, the sub-module sends the actual frequency f'm1=4992 hz to the fifth calculation module 45.

In this manner, the invention realizes a safety check on the starting theoretical value Qmi so as to prevent it from deviating excessively from the actual quantity value Qmi_EFF. The deviation also provides a concrete indication of the goodness of the frequency values Fd and fmi.

The technical effect achieved consists in printing of good quality owing to the values of the quantity deposited that are close to or coinciding with the optimal value.

For example, with a starting theoretical quantity Qmi=8.131 g/m$^2$, corresponding to a frequency of 5000 hz (see FIG. 3), in actuality a frequency f'mi=4992 hz is generated and, by linear interpolation, the value of Qmi_EFF=8.118 g/m$^2$ is obtained.

In particular, the comparison described comprises calculating a deviation of the quantity ΔQ as a function of the actual quantities Qmi_EFF of material to be deposited and of the starting theoretical quantities Qmi.

In the case of the example, ΔQ=Qmi_EFF−Qmi=0.013 g/m$^2$.

If the deviation of the quantity ΔQ is below a predefined threshold S1, it means that the value Qmi_EFF for material to be deposited is optimal.

In the case of the example, consider that S1=2 g/m$^2$ is a maximum value for the threshold value S1.

One technical effect achieved is that it is possible to vary the theoretical starting quantities without proceeding by trial and error as in the prior art, and unlike the latter, the optimal quantities are actually approachable in just one processing process for processing the initial data.

In other words, it is not necessary to perform a set of trials as in the prior art in order to find values closest to the optimal values, given that in the invention the possible values for actual quantities Qmi_EFF will surely lead to an improvement towards the optimal solution in terms of printing quality.

In a preferred embodiment of the method of the invention disclosed thus far, the method is characterized in that it can be implemented by means of a computer, as regards one or more of the steps thereof.

The invention further envisages the arrangement of a particular optimized digital printer.

The digital printer 2 comprises:
a plurality of printing modules Mod_i configured to print on printing substrates 10 with decorative inks Idi and/or material inks Imi;
a processing unit 4 configured to command the digital printer 2 to print, starting from a graphics file F1 representing a motif to be reproduced on at least one of the printing substrates 10, wherein the processing unit 4 comprises:
a first calculation module 41 configured to calculate a decoration frequency fd, for printing with decorative inks idi, as a function of a predefined resolution RIS_pred of the graphics file F1 and of a predefined running velocity Vpred of the printing substrates;
a second calculation module 42 configured to calculate single material printing frequencies fmi for each one of the material inks Imi as a function of predefined theoretical quantities Qmi of material mi;
a third calculation module 43 configured to calculate a synchronized printing frequency fM substantially corresponding to a multiple value of the decoration frequency fd, the synchronized printing frequency value fM being lower than a predefined synchronized printing value fM_pred;
a scaling module 47 configured to calculate scaling factors Dd, Dmi (i=1 . . . n) as the ratio between the synchronized printing frequency fM and one of the following: the decoration frequency fd and each one of the single material printing frequencies fmi;
a fourth calculation module 44 configured to calculate an actual printing frequency f'mi as a function of the scaling factors Dd, Dmi (i=1 . . . n);
a fifth calculation module 45 configured to calculate an actual printing resolution RIS_eff as a function of the actual material printing frequency f'mi;
a printing module 48 configured to command printing on at least one of the printing substrates 10 at the actual printing resolution RIS_eff.

In one embodiment, the digital printer comprises a sixth calculation module 46 as previously described hereinabove for calculation of the actual quantities Qmi_EFF of material to be deposited.

In one embodiment, the printing module 48 is configured to define a printing grid tab_m1, tab_m2 for printing on at least one of said printing substrates 10 at the actual printing resolution RIS_eff.

The digital printer preferably comprises an interface unit 3 as described above and that is equipped with one or more of the interface modules described previously hereinabove.

The invention further envisages a computer program, which executes one or more steps of the printing method as described for the system of the invention or for the printer of the invention.

The invention, as disclosed, offers the following advantages/technical effects:

it enables printing in quantity with a drastic reduction in production time and a printing quality that is optimal compared to conventional resolution printing systems;
it utilizes a printing system structure marked by a complexity that does not exceed that of conventional structures;
it enables easy use even by an unskilled operator.

The invention claimed is:

1. A method for digital printing in quantity, comprising the steps of:
providing a conveying unit adapted to convey printing substrates on which to print in quantity;
setting a running velocity for said conveying unit;
providing a digital printer, coupled to said conveying unit and equipped with a plurality of printing modules configured to print on said printing substrates with decorative inks and/or material inks;
providing a graphics file as input to said digital printer, said file representing a motif to be reproduced on at least one of said printing substrates at a predefined resolution
calculating a decoration frequency for printing with said decorative inks as a function of said predefined resolution and of the set running velocity;
calculating single material printing frequencies for each one of said material inks as a function of predefined theoretical quantities of material to be deposited on said printing substrates;
calculating a synchronized printing frequency substantially obtained as a multiple value of said decoration frequency lower than a predefined synchronized printing value;
calculating a scaling factor obtained as the ratio between said synchronized printing frequency and one of the following:
said decoration frequency and
each one of said single material printing frequencies;
calculating an actual printing frequency as a function of said scaling factors;
calculating an actual printing resolution as a combined function of said actual material printing frequency and of said running velocity of said conveying unit;
printing on said printing substrates at said calculated actual printing resolution.

2. The method according to claim 1, further comprising the steps of:
calculating actual quantities of material to be deposited as a function of said actual frequencies;
comparing said actual quantities of material to be deposited and said theoretical starting quantities.

3. The method according to claim 2, further comprising the steps of:
calculating a deviation of the quantity as a function of said comparison between said actual quantities of material to be deposited and said theoretical starting quantities;
if said deviation of the quantity is below a predefined threshold, calculating said actual printing resolution as a combined function of said actual material printing frequency and of said running velocity of said conveying unit; printing on said printing substrates at said actual printing resolution.

4. The method according to claim 1, wherein said step of printing on said printing substrates at said actual printing resolution comprises the step of modifying said input graphics file being inputted to said digital printer so as to determine an actual graphics file realized with said actual printing resolution.

5. The method according to claim 4, wherein said step of modifying said input graphics file comprises the steps of:
   comparing said predefined resolution with said actual printing resolution;
   calculating a number of repetitions of a line to be carried out so as to print each line of the original graphics file on said at least one of said printing substrates, as a function of said comparison;
   commanding a printing of said line in said calculated number of line repetitions.

6. The method according to claim 4, wherein said number of repetitions of a line is calculated as the integer closest to the comparison value.

7. The method according to claim 1, characterized in that it is a computer implemented method.

8. A system for digital printing in quantity, comprising:
   a conveying unit adapted to convey printing substrates on which to print in quantity and adapted to run at a running velocity;
   a digital printer, coupled to said conveying unit (and equipped with a plurality of printing modules configured to print on said printing substrates with decorative inks and/or material inks;
   a processing unit configured to command said digital printer to print, starting from a graphics file representing a motif to be reproduced on at least one of said printing substrates, wherein the processing unit is configured to:
      calculate a decoration frequency, for printing with said decorative inks, as a function of a predefined resolution of said graphics file and of said running velocity;
      calculate single material printing frequencies for each one of said material inks as a function of predefined theoretical quantities of material;
      calculate a synchronized printing frequency substantially as a multiple value of said decoration frequency, said synchronized printing frequency being lower than a predefined synchronized printing value;
      calculate scaling factors as the ratio between said synchronized printing frequency and one of the following:
         said decoration frequency and
         each one of said single material printing frequencies;
      calculate an actual printing frequency as a function of said scaling factors;
      calculate an actual printing resolution as a combined function of said actual material printing frequency and of said running velocity of said conveying unit;
      command printing by said digital printer on at least one of said printing substrates at said calculated actual printing resolution.

9. The digital printing system according to claim 8, wherein said processing unit is further configured to:
   calculate an actual quantity of material to be deposited as a function of said actual frequency calculated by said fifth calculation module;
   compare said actual quantities of material to be deposited and said starting theoretical quantities, calculating a deviation of the quantity;
wherein said processing unit is further configured to display said actual quantities of material to be deposited and said compared starting theoretical quantities.

10. The digital printing system according to claim 9, wherein said processing unit is further configured to:
   compare said deviation of the quantity with a predefined threshold;
   calculate an actual printing resolution as a combined function of said actual material printing frequency and of said running velocity of said conveying unit, if said deviation of the quantity is below a predefined threshold.

11. The digital printing system according to claim 8, wherein said processing unit is configured to command printing by said digital printer on at least one of said printing substrates at said calculated actual printing resolution by
   comparing said predefined resolution with said actual printing resolution;
   calculating a number of repetitions of a line to be carried out so as print each line of the original graphics file on said at least one of said printing substrates, as a function of said comparison;
   commanding a printing of said line in said calculated number of line repetitions.

12. The digital printing system according to claim 11, wherein said processing unit is further configured to command printing by said digital printer on at least one of said printing substrates at said calculated actual printing resolution by calculating said number of repetitions of a line as the integer closest to the comparison value.

13. The digital printing system according to claim 8, comprising an interface unit coupled to said digital printer and/or to said conveying unit and configured to receive input data for said printer and/or for said conveying unit, wherein said interface unit is configured to carry one or more of the following steps:
   receiving as input a graphics file representing a motif to be reproduced on at least one of said printing substrates at a predefined resolution;
   receiving as input said running velocity;
   receiving as input predefined theoretical quantities of material to be deposited on said printing substrates for each one of said material inks;
   receiving as input a predefined synchronized printing value;
and said processing unit is in data connection with said interface unit and configured to command said digital printer as a function of the data received from said interface unit.

14. A digital printer comprising:
   a plurality of printing modules configured to print on said printing substrates with decorative inks and/or material inks;
   a processing unit configured to command said digital printer to print, starting from a graphics file representing a motif to be reproduced on at least one of said printing substrates, wherein the processing unit is configured to:
      calculate a decoration frequency, for printing with said decorative inks, as a function of a predefined resolution of said graphics file and of a predefined running velocity of the printing substrates;
      calculate single material printing frequencies for each one of said material inks as a function of predefined theoretical quantities of material;
      calculate a synchronized printing frequency substantially as a multiple value of said decoration frequency lower than a predefined synchronized printing value;
      calculate scaling factors as a ratio between said synchronized printing frequency and one of the following:
         said decoration frequency and
         each one of said single material printing frequencies;

calculate an actual printing frequency as a function of said scaling factors;

calculate an actual printing resolution (RIS_eff) as a function of said actual material printing frequency;

command printing on at least one of said printing substrates at said calculated actual printing resolution.

15. The digital printer according to claim 14, wherein said processing unit comprises:

a printing device configured to execute the steps of the processing unit of commanding printing by said digital printer on at least one of said printing substrates at said calculated actual printing resolution and define a printing grid for printing on at least one of said printing substrates at said actual printing resolution.

16. The method according to claim 5, wherein said number of repetitions of a line is calculated as the integer closest to the comparison value.

\* \* \* \* \*